United States Patent Office 3,065,053
Patented Nov. 20, 1962

3,065,053
HOMOGENEOUS PRECIPITATION OF DIBASIC ALKALINE EARTH PHOSPHATES
Michael A. Aia, Towanda, Pa., assignor to Sylvania Electric Products Inc., a corporation of Delaware
No Drawing. Filed Feb. 23, 1960, Ser. No. 19,966
6 Claims. (Cl. 23—109)

This invention relates to the preparation of materials used in the manufacture of fluorescent phosphors, and particularly to those used in the manufacture of phosphate phosphors from one or more dibasic phosphates. The invention is especially useful in the preparation of alkaline earth phosphate phosphors.

Such phosphors are used in fluorescent lamps and other devices. For best brightness it is necessary to confine the phosphor particles to those within a narrow range of sizes and to start with materials of extremely high purity. When a dibasic phosphate is used as one of the starting materials, it is desirable to have it of high purity and in a highly crystalline form of narrow particle size range. If the range of particle sizes is too great, grinding will be required to reduce the particle size of the larger particles, but this will also diminish the size of the smaller particles to an undesirable value. Accordingly, to avoid grinding, it is desirable to have the material originally formed with the proper distribution of particle size.

I have found that this can be accomplished by precipitating the phosphates from an aqueous solution of phosphoric acid, in which urea is added to a monobasic solution of an alkaline-earth cation (or mixtures thereof) and the resulting solution hydrolyzed at 50° C. to 100° C. to effect the slow release of ammonia $NH_3$, thus causing a homogeneous pH rise and precipitating the desired product in highly crystalline form and of narrow particle size distribution and extreme purity.

The products thus obtained are useful in the preparation of phosphors because of being precipitated with high purity and narrow particle size range. The alkaline-earth phosphates can be $CaHPO_4$, $CaHPO_4.2H_2O$, $SrHPO_4$ and $BaHPO_4$ for example, and be used in making alkaline-earth halophosphate phosphors with corresponding cations.

These phosphors may have the general formula $$3[A_{e3}(PO_4)_2].A_eX_2:Sb:Mn$$

wherein X is a halide such as chlorine or fluorine, or a mixture of the two and $A_e$ is an alkaline-earth cation such as Ca, Sr, or Ba or mixtures of the three. Such phosphors have the structure and composition of the mineral apatite. The material can also be used in making other phosphate phosphors, for example strontium pyrophosphate phosphors and calcium zinc phosphate activated by stannous tin. Suitable compounds of Ca, Sr, or Ba, with excess phosphoric acid or ammonium phosphate and urea will upon hydrolysis produce dibasic phosphates of the general formula $A_eHPO_4$ (where $A_e$ is an alkaline-earth cation or mixture of cations) characterized by a degree of crystallinity and uniformity rarely achieved in commercial processes for these materials. The urea is utilized as a homogeneous source of ammonia through its reaction with water in acidic or basic solution:

(1)     $(NH_2)_2CO + H_2O \rightarrow 2NH_3 + CO_2$

The monobasic phosphates of the alkaline-earths are extremely soluble in excess $H_3PO_4$ but may be precipitated by heating or evaporation according to the solubility characteristics of the particular alkaline earth. The solubilities of barium and calcium oxides in aqueous phosphoric acid solutions have been summarized by Seidell (Solubilities of Inorganic and Metal-Organic Compounds, vol. I, 4th Edition, pp. 383, 644–7, D. Van Nostrand Co., Inc., New York, 1958). Solubility data for the $SrO-P_2O_5-H_2O$ system are given by Tartar and Lorah (Jour. Am. Chem. Soc. 51, 1091, 1929). The general reaction for preparing a monobasic solution of the alkaline-earth phosphates is:

(2)     $A_eO + 2H_3PO_4 \rightarrow A_e(H_2PO_4)_2 + H_2O$

However, if ammonia (or other base) is added, the dibasic alkaline-earth phosphate may be precipitated at a controlled rate:

(3)     $A_e(H_2PO_4)_2 + NH_3 \rightarrow A_eHPO_4 + NH_4H_2PO_4$

Thus, when urea is used as the source of ammonia as shown by Equation 1 it becomes possible to control the rate of crystallization of the dibasic phosphate to an extremely close degree by varying the temperature of hydrolysis and the concentration of the various ingredients in solution.

The dibasic alkaline-earth phosphate is thus precipitated. Urea is preferred as the source of ammonia because by its use the actual precipitant $(NH_3)$ in my example is not added as such, but is slowly generated by a homogeneous chemical reaction throughout the solution, thus eliminating the effects of localized high concentrations of precipitants. Also, urea is an almost ideal source of homogeneous pH rise since it readily hydrolyzes in acid solution, as shown in Reaction 1, above. The $CO_2$ which is also generated causes no precipitation of alkaline-earth carbonate since it is evolved as a gas in acid solutions.

The invention is further described by the following examples which are given merely by way of illustration, and other variations can be used.

EXAMPLE NO. 1

$(CaHPO_4.2H_2O)$

To a liter of 0.5–1 molar $H_3PO_4$ solution, add 0.2 g.-mols $CaCO_3$ or other suitable source of calcium at room temperature. To this solution add 0.2–2.0 g.-mols crystalline urea, with stirring. Heat the resulting solution from 12–72 hours at 60° C. with very mild agitation. Filter and wash the precipitate. Oven dry at 65–75° C. A quantitative yield of $CaHPO_4.2H_2O$ may be obtained, the yield increasing with the concentration of urea and time of heating. The precipitate is micaceous, but extremely pure and crystalline.

EXAMPLE NO. 2

$(CaHPO_4)$

To a liter of 0.4–1.0 molar $H_3PO_4$ solution, add 0.1 g.-mol $CaCO_3$ at boiling temperature. To this boiling solution add 0.5–2.0 g.-mols crystalline urea. Cover the reaction vessel to minimize evaporation losses. Heat the resulting solution from 2–12 hours at 100° C. Filter and wash the resultant precipitate. Oven dry at 100–200° C. An almost quantitative yield of anhydrous $CaHPO_4$ may be obtained, the yield increasing with the concentration of urea and time of heating. The precipitate is dense and highly crystalline, with a platy, parallelogram-like crystal habit when viewed under the microscope.

EXAMPLE NO. 3

$(\alpha+\beta-SrHPO_4)$

To a liter of 0.5–1.0 molar $H_3PO_4$ solution, add 0.1 g.-mol $SrCO_3$ or other suitable source of strontium at 65° C., with stirring. Holding the temperature at 65° C. add 0.5–2.0 mols urea. Heat the resulting solution for 12–36 hours at 65° C. Filter and wash the resultant precipitate. Oven dry at 100–200° C. An almost quantitative yield of a mixture of the alpha- and beta-modifications of $SrHPO_4$ may be obtained depending on the concentration of urea and time of heating. The alpha-SrHPO₄ may be segregated from the mixture in the form of either parallelogram-like plates or needles up to 300 microns in length. The beta-SrHPO₄ made by this method is of small crystal size, and takes the form of agglomerates when viewed under a microscope at high magnification.

EXAMPLE NO. 4

(α-SrHPO₄)

The procedure of Example No. 3 may be employed at 90° C. instead of 65° C. to obtain a precipitate of pure alpha-SrHPO₄. However, no long needles are thus obtained, but instead platy rectangles and hexagons up to 200 microns in length. The yields are almost quantitative, as above.

EXAMPLE NO. 5

(BaHPO₄)

To a liter of 0.5–1.0 molar H₃PO₄ solution add 0.1 g.-mol BaCO₃ or other suitable source of barium at 65° C., with stirring. At 65° C., add 0.5–2.0 g.-mols urea. Hold the resulting solution for 12–36 hours at 65° C. Filter and wash the resultant precipitate. Oven dry at 100–200° C. A quantitative yield of very highly crystalline BaHPO₄ may be thus obtained, the yield increasing with concentration of urea and time of heating. The habit of the crystals varies with the ratio of Ba/P in solution. Higher Ba/P ratios than those indicated produce platy crystals of hexagon and parallelogram-like habit. The indicated range of Ba/P mol ratio in solution will produce cube-like crystals up to ⅛ inch on each side, depending on the turbulence, temperature and pH in the system.

It is known that the rate of hydrolysis of urea increases with temperature. In solutions of pH less than 2, as in the disclosed invention, the reaction would eventually go to completion at room temperature, but would be very slow and impractical. I have found that increasing the temperature from 90° to 100° C. increases the rate of pH rise by about a 6–7 factor. Furthermore, increasing the concentration of urea from 0.5 to 2.0 molar increases the rate by a factor of about 3–4.

In order to prepare CaHPO₄.2H₂O, the temperature should be maintained below about 65° C. where anhydrous CaHPO₄ would be the saturating solid. Temperature ranges of precipitation for these and for the other alkaline-earth dibasic phosphates are summarized below.

Table I

COMPARISON OF PHASES PRECIPITATED FROM ALKALINE-EARTH MONOBASIC PHOSPHATE SOLUTIONS AT VARIOUS TEMPERATURES (SOLUTIONS PREPARED FROM ALKALINE-EARTH CARBONATE AND EXCESS H₃PO₄, FOLLOWED BY ADDITION OF UREA)

| Approximate Temperature Range (° C.)[1] | Solid Phase(s) |
| --- | --- |
| 10–60 | CaHPO₄.2H₂O |
| 60–65 | CaHPO₄.2H₂O CaHPO₄ |
| 70–100 | CaHPO₄ |
| 10–20 | β-SrHPO₄ |
| 20–70 | α+β-SrHPO₄ |
| 80–100 | α-SrHPO₄ |
| 10–100 | BaHPO₄ |

[1] It is possible to shift the phase transition temperatures indicated by adding various impurities.

Typical data for the variation in rate of pH with temperature and urea concentration follow below.

Table II

COMPARISON OF UREA HYDROLYSES IN ACIDIC CALCIUM PHOSPHATE SOLUTIONS AT 90° AND 100° C.

| Urea Hydrolysis Temp. (° C.) | Urea Conc. (mols/liter) | Time Elapsed From pH 3 to pH 5 (Hrs.) |
| --- | --- | --- |
| 90 | 0.5 | 5.0 |
| 100 | 2.0 | 0.5 |

It is obvious that the higher temperature and urea concentration increase the rate of pH rise by a factor of 10.

Without departing from the spirit and scope of this invention, the required monobasic phosphate solutions may be prepared from the alkaline-earth oxide, hydroxide, chloride, nitrate, acetate, and formate and mixtures of these, as well as from the carbonate indicated in the examples. Likewise, phosphoric acid may be combined with various percentages of ammonia or ammonium phosphates, and still produce satisfactory results. It is my intention to cover these variations in the following claims.

For convenience we have used a dash (–) to represent the word "to" in describing the embodiments of the invention. For example, we have written "100–200° C." in Example No. 5 to mean "100 to 200° C." For typographical convenience in writing formulae I have placed the period (.) at the bottom of the number instead of at the middle when we use it to separate out the part of the formula representing the water of crystallization from the part representing the main compound in the crystal. That is, in CaHPO₄.2H₂O, the period (.) merely separates the 2H₂O from the CaHPO₄, and is not a decimal point, that is, it does not mean 0.2H₂O. Elsewhere, of course, the decimal point has its usual meaning.

What I claim is:

1. A process for preparing highly-crystalline dibasic alkaline-earth phosphates, said process comprising the following steps: dissolving a substance selected from the group consisting of the oxides, hydroxides, carbonates, chlorides and nitrates of the alkaline earths in an aqueous solution having an excess at room temperature of a substance selected from the group consisting of phosphoric acid and ammonium phosphate; then adding at least about 0.02 gram-moles of crystalline urea per liter of solution and heating the resultant mixture at a temperature of about 40 to 100° C. for a time sufficient to precipitate the dibasic alkaline-earth phosphate.

2. The method of claim 1 wherein CaHPO₄.2H₂O is produced by heating an acidic calcium phosphate solution containing urea at about 40° C. to 60° C.

3. The method of claim 1 wherein CaHPO₄ is produced by heating an acidic calcium phosphate solution containing urea at about 70° C. to 100° C.

4. The method of claim 1 wherein α- and β-SrHPO₄ is produced by heating an acidic strontium phosphate solution containing urea at about 40° C. to 65° C.

5. The method of claim 1 wherein α-SrHPO₄ is produced by heating an acidic strontium phosphate solution containing urea at about 70° C. to 100° C.

6. The method of claim 1 wherein BaHPO₄ is produced by heating an acidic barium phosphate solution containing urea at 40° C. to 100° C.

References Cited in the file of this patent

UNITED STATES PATENTS

| | | |
| --- | --- | --- |
| 2,021,671 | Skinner | Nov. 19, 1935 |
| 2,108,940 | MacIntire | Feb. 22, 1938 |
| 2,697,024 | Moss et al. | Dec. 14, 1954 |